United States Patent
Foukes et al.

(10) Patent No.: US 8,709,141 B2
(45) Date of Patent: Apr. 29, 2014

(54) HEAT RELEASABLE COMPOSITE COATINGS AND RELATED METHODS

(75) Inventors: Richard J. Foukes, Mars, PA (US); Ken W. Niederst, Allison Park, PA (US); Kevin P. Gallagher, Gibsonia, PA (US); Jackie L. Kulfan, Mars, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1563 days.

(21) Appl. No.: 11/681,407

(22) Filed: Mar. 2, 2007

(65) Prior Publication Data

US 2008/0210120 A1 Sep. 4, 2008

(51) Int. Cl.
*C09D 193/00* (2006.01)
*B05D 5/12* (2006.01)

(52) U.S. Cl.
USPC .............................. 106/6; 427/97.1

(58) Field of Classification Search
None
See application file for complete search history.

(56) References Cited

U.S. PATENT DOCUMENTS

| | | | |
|---|---|---|---|
| 3,326,741 A * | 6/1967 | Olson | 428/335 |
| 5,575,035 A * | 11/1996 | Reis et al. | 15/324 |
| 5,684,067 A * | 11/1997 | Muthiah et al. | 523/453 |
| 5,904,158 A | 5/1999 | Mitchell et al. | 134/4 |
| 5,935,655 A | 8/1999 | Beleck | 427/380 |
| 6,562,402 B2 * | 5/2003 | Scholz et al. | 427/208.4 |
| 6,630,228 B1 * | 10/2003 | Jarnebrink et al. | 428/195.1 |
| 6,841,221 B2 * | 1/2005 | MacQueen | 428/141 |
| 6,872,761 B2 | 3/2005 | LeStarge | 523/218 |
| 2002/0094403 A1 | 7/2002 | Ishikawa et al. | 428/40.1 |
| 2003/0035944 A1 * | 2/2003 | Blackwell | 428/328 |
| 2004/0097607 A1 | 5/2004 | Fujita et al. | 521/82 |
| 2004/0200564 A1 * | 10/2004 | Kinsey et al. | 156/230 |
| 2005/0016675 A1 | 1/2005 | Bain et al. | 156/293 |
| 2005/0136251 A1 * | 6/2005 | Kishimoto et al. | 428/343 |
| 2007/0098962 A1 * | 5/2007 | Laprade | 428/195.1 |

FOREIGN PATENT DOCUMENTS

| | | |
|---|---|---|
| EP | 1348490 B1 | 7/2006 |
| JP | 4-292668 A | 10/1992 |
| JP | 6-246226 A | 9/1994 |
| JP | 8-271138 A | 10/1996 |
| JP | 11258998 A * | 9/1999 |
| JP | 2002-187973 | 7/2002 |
| WO | WO 00/75254 A1 | 12/2000 |
| WO | WO 2004/087826 A2 | 10/2004 |

* cited by examiner

*Primary Examiner* — Melvin C Mayes
*Assistant Examiner* — Stefanie Cohen
(74) *Attorney, Agent, or Firm* — William E. Kuss; Robert J. Toth

(57) ABSTRACT

Disclosed are heat releasable multi-component composite coatings. These coatings include an under coating and an over coating deposited over at least a portion of the under coating. The under coating is deposited from a coating composition that includes a film-forming resin and thermally expandable capsules having an average diameter of 5 to 25 μm. The over coating layer has a 60 degree gloss of no more than 60 gloss units.

20 Claims, No Drawings

HEAT RELEASABLE COMPOSITE COATINGS AND RELATED METHODS

FIELD OF THE INVENTION

The present invention relates to heat releasable multi-component composite coatings having a desirable appearance such that they are suitable for use in certain commercial products, such as consumer electronics equipment. The present invention also relates to methods for providing a heat releasable multi-component composite coating with desirable appearance on a substrate, as well as related coated substrates.

BACKGROUND INFORMATION

In certain markets, such as the consumer electronics market, among others, it is desirable to apply a decorative and protective coating to a substrate, such as, for example, metallic and plastic substrates. In some cases, for economic, environmental, or other reasons, it may be desirable to recycle such substrates for further use. Such recycling, however, often requires the removal of the original coating from the substrate, and, in many cases, the difficulty associated with such removal renders recycling less commercially attractive.

As a result, it would be desirable to provide a multi-component composite coating that can be relatively easy to remove from a substrate upon the application of heat. Moreover, it would be desirable to provide such coatings that have a pleasing, smooth visual appearance, such that the coatings are suitable for use on commercial products, such as, for example, consumer electronics equipment.

SUMMARY OF THE INVENTION

In certain respects, the present invention is directed to heat releasable multi-component composite coatings. These coatings comprise: (1) an under coating deposited from a coating composition comprising: (a) a film-forming resin; and (b) thermally expandable capsules having an average initial particle size of 5 to 25 microns ("µm"); and (2) an over coating deposited over at least a portion of the under coating, wherein the over coating has a 60 degree gloss of no more than 60 gloss units.

In other respects, the present invention is directed to methods for depositing a heat releasable multi-component composite coating on a substrate. These methods comprise: (a) depositing a coating composition onto at least a portion of the substrate, wherein the coating composition comprises (i) a film-forming resin, and (ii) thermally expandable capsules having an average initial particle size of 5 to 25 µm; (b) allowing the coating composition to coalesce to form a substantially continuous under coating on the substrate; (c) depositing a coating composition comprising a film-forming resin onto at least a portion of the substrate and over at least a portion of the under coating; (d) allowing the coating composition to coalesce to form a substantially continuous over coating on the substrate and over at least a portion of the under coating; and (e) curing at least one of the under coating and the over coating by heating the under coating and the over coating to a predetermined bake temperature for a predetermined period of time. In these methods, the over coating has a 60 degree gloss of no more than 60 gloss units. 15.

The present invention is also directed a consumer electronics device at least partially coated with at least one coating comprising: (a) a film-forming resin; and (b) thermally expandable capsules having an average initial particle size of 5 to 25 µm.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to heat releasable multi-component composite coatings. As used herein, the term "heat releasable" refers to a coating in which a significant portion of the coating will delaminate from a substrate when the temperature of the coating is raised to a selected temperature for a selected period of time, such that the remainder of the coating is capable of being relatively easily removed from the substrate by simple mechanical means, such as scraping. As used herein, the term "multi-component composite coating" refers to a multilayer coating system comprising two or more layers of material coated at least partially atop each other over a substrate.

As previously indicated, the multi-component composite coatings of the present invention comprise an under coating. As used herein, the term "under coating" refers to a coating that is deposited on a substrate between the substrate and another coating. Exemplary under coatings include, but are not limited to, electrodeposition coatings, primer coatings and pigmented basecoats in a basecoat/clearcoat composite coating system. In certain embodiments of the present invention, the undercoating comprises the primer and/or colored basecoat in a multi-component composite coating comprising a primer, a colored basecoat deposited over at least a portion of the primer, and a transparent clearcoat deposited over at least a portion of the primer and colored basecoat.

As indicated, the under coating in the multi-component composite coatings of the present invention is deposited from a coating composition comprising a film-forming resin. As used herein, the term "film-forming resin" refers to resins that can form a self-supporting continuous film on at least a horizontal surface of a substrate upon removal of any diluents or carriers present in the composition or upon curing at ambient or elevated temperature.

The coating composition from which the under coating is deposited may comprise any of a variety of thermoplastic and/or thermosetting film-forming resins known in the art. Moreover, this coating composition may be a water-based or solvent-based liquid composition, or, alternatively, can be in solid particulate form, i.e., a powder coating composition. In certain embodiments, this coating composition is a solvent-based composition and the thermally expandable capsules are selected so as to be resistant to the solvent diluent(s) present in the coating composition.

Suitable film-forming resins for inclusion in the composition from which the under coating is deposited include, without limitation, those typically used in automotive OEM coating compositions, automotive refinish coating compositions, industrial coating compositions, architectural coating compositions, coil coating compositions, and aerospace coating compositions, among others.

In certain embodiments, the film-forming resin included in the composition from which the under coating is deposited comprises a thermoplastic film-forming resin. As used herein, the term "thermoplastic film-forming resin" refers to resins that comprise polymeric components that are not joined by covalent bonds and thereby can undergo liquid flow upon heating and are soluble in solvents.

Suitable thermoplastic film-forming resins include, but are not limited to, thermoplastic polyolefins, such as polyethylene, polypropylene, polyamides, such as nylon, thermoplastic polyurethanes, thermoplastic polyesters, acrylic polymers, vinyl polymers, polycarbonates, acrylonitrile-butadiene-styrene ("ABS") copolymers, ethylene propylene diene terpolymer ("EPDM") rubber, copolymers, and mixtures of any of the foregoing.

In certain embodiments, the film-forming resin included in the composition from which the under coating is deposited comprises a thermosetting film-forming resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation, or, in some cases, such a reaction is carried out under ambient conditions. Once cured or crosslinked, a thermosetting resin will not melt upon the application of heat and is insoluble in solvents.

Suitable thermosetting film-forming resins include, for example, acrylic polymers, polyester polymers, polyurethane polymers, polyamide polymers, polyether polymers, polysiloxane polymers, copolymers thereof, and mixtures thereof. Generally these polymers can be any polymers of these types made by any method known to those skilled in the art. Such polymers may be solvent borne or water dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof.

The thermosetting film-forming resins typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing.

Appropriate mixtures of film-forming resins may also be used in the preparation of the coating compositions from which the under coating is deposited.

In addition to the film-forming resin, the coating composition from which the under coating is deposited also comprises thermally expandable capsules having an average initial particle size of 5 to 25 μm, in some cases 10 to 20 μm, and in yet other cases, 10 to 17 μm. As used herein, the term "average initial particle size" refers to the average particle size of the capsules prior to any expansion. Moreover, the thermally expandable capsules have an initial expansion temperature greater than a predetermined bake temperature. In certain embodiments, the coating composition from which the under coating is deposited comprises thermally expandable capsules having an initial expansion temperature at least 30° F. (16.7° C.) higher than the predetermined bake temperature. As used herein, the term "thermally expandable capsule" refers to a small hollow shell comprising a volatile material that expands at a predetermined temperature.

In certain embodiments, the thermally expandable capsules present in the coating composition from which the under coating is deposited comprise a volatile hydrocarbon positioned within a wall of a resin, such as a thermoplastic resin. Examples of hydrocarbons suitable for use in such capsules are, without limitation, methyl chloride, methyl bromide, trichloroethane, dichloroethane, n-butane, n-heptane, n-propane, n-hexane, n-pentane, isobutane, isopentane, neopentane, petroleum ether, and aliphatic hydrocarbons containing fluorine, such as Freon, or a mixture thereof.

Examples of the materials which are suitable for forming the wall of the thermally expandable capsule include polymers of vinylidene chloride, acrylonitrile, styrene, polycarbonate, methyl methacrylate, ethyl acrylate, and vinyl acetate, copolymers of these monomers, and mixtures of the polymers of the copolymers. A crosslinking agent may be used if desired.

As previously indicated, the average initial particle size of the thermally expandable capsules present in the coating composition from which the under coating is deposited is in the range of 5 to 25 μm, such as 10 to 20 μm, and, in some cases 10 to 17 μm. The present inventors have discovered that the use of thermally expandable capsule having an average initial particle size greater than 25 μm negatively impacts the important appearance properties of the multi-component composite coatings of the present invention.

The thermally expandable capsules included in the coating composition from which the under coating is deposited have an initial expansion temperature that is higher, in some cases at least 30° F. (16.7° C.) higher, than a predetermined bake temperature. As used herein, the term "initial expansion temperature" refers to the temperature at which expansion of the capsule starts. As used herein, the term "predetermined bake temperature" refers to the target temperature that the multi-component composite coating will reach for the purpose of curing and/or drying any of the coatings in the multi-component composite coating.

For example, in certain embodiments, the thermally expandable capsules have an initial expansion temperature of at least 200° F. (93.3° C.) and the predetermined bake temperature is no more than 170° F. (76.7° C.).

Thermally expandable capsules suitable for use in the present invention are commercially available from various companies. Suitable commercially available thermally expandable capsules are set forth in the following table:

|  | Product Name | | |
| --- | --- | --- | --- |
|  | Dualite U015-135D | Expancel 092 DU40 | Dualite 017-175D |
| Supplier | Henkel | Akzo Nobel | Henkel |
| Average Initial Particle Size | 10-16 µm | 10-17 µm | ~22 µm |
| Initial Expansion Temperature | 203-212° F. (95-100° C.) | 261-282° F. (127-139° C.) | 284-293° F. (140-145° C.) |
| Temperature of Maximum Expansion | 275-293° F. (135-145° C.) | 327-363° F. (164-184° C.) | 347-365° F. (175-185° C.) |
| Expanding Liquid | Isobutane | Isopentane | n-Pentane |

In certain embodiments, the weight ratio of thermally expandable capsules to resin solids in the coating composition from which the under coating is deposited is at least 0.25:1, in some cases at least 0.5:1, and, in yet other cases, at least 1:1.

If desired, the coating composition from which the under coating of the multi-component composite coating is deposited can comprise other optional materials well known in the art of formulated surface coatings, such as plasticizers, antioxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries.

In certain embodiments, particularly those embodiments in which the under coating is a colored basecoat in the basecoat/clearcoat system, as described earlier, the coating composition from which the under coating is deposited also include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating composition from which the under coating of the multi-component composite coating is deposited can be applied to the substrate by any of a variety of methods including spraying, brushing, dipping, and roll coating, among other methods. After application of the coating composition to the substrate, the composition is allowed to coalesce to form a substantially continuous film on the substrate to form the under coating. In certain embodiments, the film thickness of the under coating is at least 0.5 mils (12.7 µm), in some cases, 0.5 to 20 mils (12.7 to 508 µm), in other cases 0.5 to 5 mils (12.7 to 127 µm), or, in still other cases, 0.5 to 2 mils (12.7 to 50.8 µm) in thickness.

As previously indicated, the multi-component composite coatings of the present invention also comprise an over coating deposited over at least a portion of the under coating. As used herein, the term "over coating" refers to a coating that is deposited over the under coating, and may be deposited directly over the under coating or one or more other coatings may be deposited between the under coating and the over coating. Exemplary over coatings include, but are not limited to, colored monocoat topcoats and transparent clearcoats in a basecoat/clearcoat composite coating system. In certain embodiments of the present invention, the overcoating comprises the transparent clearcoat deposited over at least a portion of a primer and colored basecoat.

The coating composition from which the overcoating is deposited may be any solventborne, waterborne, or powder composition known to those skilled in the art, and often includes film-forming resins and crosslinking agents such as those disclosed above with respect to the coating composition from which the under coating is deposited. Suitable solventborne compositions include those disclosed in U.S. Pat. No. 6,365,699. Suitable waterborne compositions include those disclosed in U.S. Pat. No. 6,270,905. A "powder" topcoating composition is meant to include coating compositions comprising dry powders and powders that are slurried in a solution, such as water. Suitable powder slurry compositions include those disclosed in International Publications WO 96/32452 and 96/37561, European Patents 652264 and 714958, and Canadian Patent No. 2,163,831. Other suitable powder topcoats are described in U.S. Pat. No. 5,663,240 and include epoxy functional acrylic copolymers and polycarboxylic acid crosslinking agents. The over coating can be deposited by any means as disclosed above with respect to application of the under coating.

In certain embodiments, the coating compositions from which the over coating layer is deposited is a crosslinkable composition comprising at least one thermosettable film-forming material and at least one crosslinking material such as are described above. Such a composition can include additives such as are discussed above, but, in certain embodiments, does not include any colorant. In certain embodiments, the film thickness of the over coating is at least 0.5 mils (12.7 µm), such as 0.5 to 20 mils (12.7 to 508 µm), or, in some cases, 0.5 to 5 mils (12.7 to 127 µm), or, in other cases, 0.5 to 2 mils (12.7 to 50.8 µm) in thickness.

As previously indicated, in the multi-component composite coatings of the present invention, the over coating has a 60 degree gloss of no more than 60 gloss units, in some cases the over coating is a "mid-gloss" coating which means the coating has a 60 degree gloss of 50 to 60 gloss units. As used herein, the term "gloss" refers to the ability of a coating to reflect light, with a higher gloss value corresponding to a larger amount of light being reflected. As will be understood by those skilled in the art, gloss measurements can be made using a BYK/Haze Gloss meter available from Gardner Instrument Company, Inc. As used herein, the term "60 degree gloss" refers to the gloss of a coated substrate determined at a 60 degree angle using such a BYK/Haze Gloss meter.

The multi-component composite coatings of the present invention are suitable for application to any of a variety of substrates, including human and/or animal substrates, such as keratin, fur, skin, teeth, nails, and the like, as well as plants, trees, seeds, agricultural lands, such as grazing lands, crop lands and the like; turf-covered land areas, e.g., lawns, golf courses, athletic fields, etc., and other land areas, such as forests and the like.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminium derivatives, quebracho, chestnut or mimosa extracts, aromatic syntans, polyurethanes, (co) polymers of (meth) acrylic acid compounds or melamine/, dicyanodiamide/and/or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface In certain embodiments, the multi-component composite coatings of the present invention are formed by a method comprising: (a) depositing a coating composition onto at least a portion of a substrate, wherein the coating composition comprises (i) a film-forming resin, and (ii) thermally expandable capsules having an average initial particle size of 5 to 25 µm; (b) allowing the coating composition to coalesce to form a substantially continuous under coating on the substrate; (c) depositing a coating composition comprising a film-forming resin onto at least a portion of the substrate and over at least a portion of the under coating; (d) allowing the coating composition to coalesce to form a substantially continuous over coating on the substrate and over at least a portion of the under coating; and (e) curing at least one of the under coating and the over coating by heating the under coating layer and/or the over coating to the predetermined bake temperature for a predetermined period of time. In these methods, the over coating in the resultant multi-component composite coating has a 60 degree gloss of no more than 60 gloss units.

It has been surprisingly discovered that the multi-component composite coatings of the present invention both (i) significantly delaminate from a substrate when the temperature of the coating reaches a selected temperature for a selected period of time, such that the remainder of the coating is capable of being relatively easily removed from the substrate by simple mechanical means, such as scraping, and (ii) have a pleasing, smooth visual appearance, such that the coatings are suitable for use on commercial products, such as, for example, consumer electronics equipment. Indeed, it has been discovered that when the composition from which the under coating is deposited comprises thermally expandable capsules having an average diameter or initial expansion temperature outside of the claimed range or when the over coating has a 60 degree gloss outside of the claimed range, the resulting multi-component composite coating is either difficult to sufficiently remove from the substrate upon the application of heat only, or, if it is relatively easy to remove such a coating from the substrate upon the application of heat only, the coating has a rough, unappealing visual appearance that would not be suitable for use in many of the intended applications of the present invention.

Also a result, the present invention is also directed to methods for removing a multi-component composite coating from a substrate. These methods comprise (i) heating, for a predetermined period of time, the multi-component composite coating described herein to a temperature greater than the initial expansion temperature of the thermally expandable capsules present in the under coating so as to cause significant delamination of the coating from the substrate, and then (ii) removing the coating from the substrate by mechanical means, such as scraping.

As previously indicated, the present invention can, in at least some cases, find particular application in the consumer electronics market. As a result, the present invention is also directed to a consumer electronics device, such as a cell phone, personal digital assistant, smart phone, personal computer, digital camera, or the like, which is at least partially coated with at least one coating comprising: (a) a film-forming resin; and (b) thermally expandable capsules having an average initial particle size of 5 to 25 µm. In certain embodiments, such a device is at least partially coated with a multi-component composite coating comprising: (1) an under coating deposited from a coating composition comprising: (a) a film-forming resin; and (b) thermally expandable capsules having an average initial particle size of 5 to 25 µm; and (2) an over coating deposited over at least a portion of the under coating, wherein the over coating has a 60 degree gloss of no more than 60 gloss units.

Illustrating the invention are the following examples that are not to be considered as limiting the invention to their details. All parts and percentages in the examples, as well as throughout the specification, are by weight unless otherwise indicated.

EXAMPLE 1

In an unlined half-pint can, the following materials were placed and subsequently shaken for 5 minutes on a Red Devil shaker: 50 g of adhesion promoting primer SX1050 available from PPG Industries, Inc. (3.9% solids) and 1.17 g of Dualite U015-135D dry unexpanded microspheres available from Henkel (100% solids) to give a new primer with a 0.6:1 w/w ratio of thermal expanding microspheres to resin solids. The primer was applied to substrate on the same day it was mixed as described in Example 5 below.

EXAMPLE 2

In an unlined half-pint can, the following materials were placed and subsequently shaken for 5 minutes on a Red Devil shaker: 50 g of adhesion promoting primer SX1050 (3.9% solids) and 1.95 g of Dualite U015-135D dry unexpanded microspheres (100% solids) to give a new primer with a 1:1 w/w ratio of thermal expanding microspheres to resin solids. The primer was applied to substrate on the same day it was mixed as described in Example 6 and 7 below.

EXAMPLE 3

In an unlined half-pint can, the following materials were placed and subsequently shaken for 5 minutes on a Red Devil shaker: 50 g of adhesion promoting primer SX1050 (3.9% solids) and 1.95 g of Dualite U017-175D dry unexpanded microspheres available from Henkel (100% solids) to give a new primer with a 1:1 w/w ratio of thermal expanding microspheres to resin solids. The primer was applied to substrate on the same day it was mixed as described in Example 8 below.

EXAMPLE 4

In an unlined half-pint can, the following materials were placed and subsequently shaken for 5 minutes on a Red Devil shaker: 50 g of adhesion promoting primer SX1050 (3.9% solids) and 1.95 g of Expancel 092 DU 40 dry unexpanded microspheres available from Akzo Nobel (100% solids) to give a new primer with a 1:1 w/w ratio of thermal expanding microspheres to resin solids. The primer was applied to substrate on the same day it was mixed as described in Example 9 and 10 below.

EXAMPLE 5

GE Cycloy IP1000 PC/ABS substrate, available from CPRD Testing Panels Inc., was cut into 4"×4" squares, wiped with isopropanol, and allowed to dry thoroughly before application of the primer layer. The composition of Example 1 was hand spray applied to the PC/ABS substrate, with a line pressure of 50 psi, to a dry film build of ~0.8+/−0.1 mils. Black basecoat XPB21290VS, available from PPG Industries, Inc., was subsequently applied to the substrate by the same method to a film build of ~0.6 mils. Finally, a two component high gloss clearcoat system XPC60036 (60 degree gloss of 90-100 gloss units) available from PPG Industries, Inc was then applied to the basecoat at a film build of ~1.1 mils. The layers were applied wet on wet on wet, with no forced dry time between layers. One to two minutes passed at ambient conditions between layers while the spray gun was cleaned and coatings were changed. The substrate and layered coating system was allowed to flash at ambient conditions for 10 minutes followed by a 30 minute bake at 170° F. (76.7° C.) in an electric forced air oven.

EXAMPLE 6

GE Cycloy IP1000 PC/ABS substrate, available from CPRD Testing Panels Inc., was cut into 4"×4" squares, wiped with isopropanol, and allowed to dry thoroughly before application of the primer layer. The composition of Example 2 was hand spray applied to the PC/ABS substrate, with a line pressure of 50 psi, to a dry film build of ~0.5+/−0.1 mils. Black basecoat XPB21290VS, available from PPG Industries, Inc., was subsequently applied to the substrate by the same method to a film build of ~0.6 mils. Finally, a two component high gloss clearcoat system XPC60036 (60 degree gloss of 90-100 gloss units) available from PPG Industries, Inc was then applied to the basecoat at a film build of ~1.1 mils. The layers were applied wet on wet on wet, with no forced dry time between layers. One to two minutes passed at ambient conditions between layers while the spray gun was cleaned and coatings were changed. The substrate and layered coating system was allowed to flash at ambient conditions for 10 minutes followed by a 30 minute bake at 170° F. (76.7° C.) in an electric forced air oven.

EXAMPLE 7

GE Cycloy IP1000 PC/ABS substrate, available from CPRD Testing Panels Inc., was cut into 4"×4" squares, wiped with isopropanol, and allowed to dry thoroughly before application of the primer layer. The composition of Example 2 was hand spray applied to the PC/ABS substrate, with a line pressure of 50 psi, to a dry film build of ~0.4+/−0.1 mils. Black basecoat XPB21290VS, available from PPG Industries, Inc., was subsequently applied to the substrate by the same method to a film build of ~0.6 mils. Finally, a two component mid gloss clearcoat system XPC60021 (60 degree gloss of ~50 gloss units) available from PPG Industries, Inc was then applied to the basecoat at a film build of ~0.9 mils. The layers were applied wet on wet on wet, with no forced dry time between layers. One to two minutes passed at ambient conditions between layers while the spray gun was cleaned and coatings were changed. The substrate and layered coating system was allowed to flash at ambient conditions for 10 minutes followed by a 30 minute bake at 170° F. (76.7° C.) in an electric forced air oven.

EXAMPLE 8

GE Cycloy IP1000 PC/ABS substrate, available from CPRD Testing Panels Inc., was cut into 4"×4" squares, wiped with isopropanol, and allowed to dry thoroughly before application of the primer layer. The composition of Example 3 was hand spray applied to the PC/ABS substrate, with a line pressure of 50 psi, to a dry film build of ~0.5+/−0.1 mils. Black basecoat XPB21290VS, available from PPG Industries, Inc., was subsequently applied to the substrate by the same method to a film build of ~0.9 mils. Finally, a two component high gloss clearcoat system XPC60036 (60 degree gloss of 90-100 gloss units) available from PPG Industries, Inc was then applied to the basecoat at a film build of ~1.2 mils. The layers were applied wet on wet on wet, with no forced dry time between layers. One to two minutes passed at ambient conditions between layers while the spray gun was cleaned and coatings were changed. The substrate and layered coating system was allowed to flash at ambient conditions for 10 minutes followed by a 30 minute bake at 170° F. (76.7° C.) in an electric forced air oven.

EXAMPLE 9

GE Cycloy IP1000 PC/ABS substrate, available from CPRD Testing Panels Inc., was cut into 4"×4" squares, wiped with isopropanol, and allowed to dry thoroughly before application of the primer layer. The composition of Example 4 was hand spray applied to the PC/ABS substrate, with a line pressure of 50 psi, to a dry film build of ~0.5+/−0.1 mils. Black basecoat XPB21290VS, available from PPG Industries, Inc., was subsequently applied to the substrate by the same method to a film build of ~0.9 mils. Finally, a two component high gloss clearcoat system XPC60036 (60 degree gloss of 90-100 gloss units) available from PPG Industries, Inc was then applied to the basecoat at a film build of ~1.2 mils. The layers were applied wet on wet on wet, with no forced dry time between layers. One to two minutes passed at ambient conditions between layers while the spray gun was cleaned and coatings were changed. The substrate and layered coating system was allowed to flash at ambient conditions for 10 minutes followed by a 30 minute bake at 170° F. (76.7° C.) in an electric forced air oven.

EXAMPLE 10

GE Cycloy IP1000 PC/ABS substrate, available from CPRD Testing Panels Inc., was cut into 4"×4" squares, wiped with isopropanol, and allowed to dry thoroughly before application of the primer layer. The composition of Example 4 was hand spray applied to the PC/ABS substrate, with a line pressure of 50 psi, to a dry film build of ~0.4+/−0.1 mils. Black basecoat XPB21290VS, available from PPG Industries, Inc., was subsequently applied to the substrate by the same method to a film build of ~0.6 mils. Finally, a two component mid gloss clearcoat system XPC60021 (~50 on a 60 degree reading) available from PPG Industries, Inc was then applied to the basecoat at a film build of ~0.9 mils. The layers were applied wet on wet on wet, with no forced dry time between layers. One to two minutes passed at ambient conditions between layers while the spray gun was cleaned and coatings were changed. The substrate and layered coating system was allowed to flash at ambient conditions for 10 minutes followed by a 30 minute bake at 170° F. (76.7° C.) in an electric forced air oven.

Testing and Results

Each prepared sample was cut into 4-1" squares before heat testing. Two squares were baked in the same electric forced air oven used for curing at two different bake schedules: 30 minutes at 250° F. (121° C.) and 30 minutes at 300° F. (149° C.). These two squares were compared to an unbaked square for appearance change and efficiency of coating removal. Appearance was evaluated visually and judged acceptable or not acceptable by those familiar with the end product requirements. Degree of delamination is reported as a percentage of basecoat/clearcoat system separated from the substrate without mechanical means as determined by visual estimation. Results are set forth in Table I.

TABLE I

| | Primer Film | | | % Delamination w/o mechanical means | |
|---|---|---|---|---|---|
| Example | Primer | Build | Appearance | 30' @ 250 F. | 30' @ 300 F. |
| 5 | Example 1 | 0.77 mils | Speckled Unacceptable | 75 | 60 |
| 6 | Example 2 | 0.52 mils | Speckled Unacceptable | 90 | 99 |
| 7 | Example 2 | 0.36 mils | Similar to control[1] Acceptable | 20 | 1 |
| 8 | Example 3 | 0.54 mils | Roughened Unacceptable | 0 | 100 |
| 9 | Example 4 | 0.52 mils | Speckled Unacceptable | 0 | 33 |
| 10 | Example 4 | 0.37 mils | Similar to control Acceptable | 0 | 35 |

[1]"Similar to control" means that the coating had a smooth, continuous appearance essentially indistinguishable to the naked eye from a similar coating system in which the undercoating did not include any thermally expandable capsules.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A heat releasable multi-component composite coating comprising:
    (1) an under coating deposited from a coating composition comprising:
        (a) a film-forming resin; and
        (b) thermally expandable capsules having an average initial particle size of 5 to 25 microns, and
    (2) an over coating deposited over at least a portion of the under coating, wherein the over coating has a 60 degree gloss of no more than 60 gloss units, wherein the thermally expandable capsules are in an unexpanded state, and wherein the under coating is selected from the group consisting of a primer coating, an electrodeposition coating, and a pigmented basecoat.

2. The coating of claim 1, wherein the thermally expandable capsules have an initial expansion temperature greater than a predetermined bake temperature of the under coating and/or the over coating.

3. The coating of claim 2, wherein the initial expansion temperature is at least 30° F. greater than the predetermined bake temperature.

4. The coating of claim 1, wherein the under coating is a primer.

5. The coating of claim 1, wherein the average initial particle size of the capsules is 10 to 20 microns.

6. The coating of claim 1, wherein the thermally expandable capsules comprise a volatile hydrocarbon positioned within a wall of resin.

7. The coating of claim 2, wherein the thermally expandable capsules have an initial expansion temperature of at least 200° F.

8. The coating of claim 1, wherein the weight ratio of the thermally expandable capsules to resin solids in the coating composition from which the under coating is deposited is at least 0.25:1.

9. The coating of claim 8, wherein the weight ratio of the thermally expandable capsules to resin solids in the coating composition from which the under coating is deposited is at least 0.5:1.

10. The coating of claim 1, wherein the over coating is a mid-gloss coating.

11. A substrate at least partially coated with the coating of claim 1.

12. The substrate of claim 11, wherein the substrate is selected from a metallic substrate and a polymeric substrate.

13. A method of forming a multi-component composite coating comprising:
(a) depositing a coating composition onto at least a portion of a substrate to form an under coating, wherein the coating composition comprises:
(i) a film-forming resin, and
(ii) thermally expandable capsules having an average initial particle size of 5 to 25 μm;
(b) allowing the coating composition to coalesce to form a substantially continuous under coating on the substrate;
(c) depositing a coating composition comprising a film-forming resin onto at least a portion of the substrate and over at least a portion of the under coating;
(d) allowing the coating composition to coalesce to form a substantially continuous over coating on the substrate and over at least a portion of the under coating; and
(e) curing at least one of the under coating and the over coating by heating the under coating layer and/or the over coating to a predetermined bake temperature of the under coating and/or the over coating for a predetermined period of time, wherein the thermally expandable capsules have an initial expansion temperature that is higher than the predetermined bake temperature, wherein the under coating is selected from the group consisting of a primer coating, an electrodeposition coating, and a pigmented basecoat, and wherein the over coating in the resultant multi-component composite coating has a 60 degree gloss of no more than 60 gloss units.

14. A method for recycling a coating substrate, comprising:
(a) heating, for a predetermined period of time, the substrate of claim 11 to a temperature greater than the initial expansion temperature of the thermally expandable capsules, and then
(b) removing the coating from the substrate by mechanical means.

15. A consumer electronics device at least partially coated with a multi-component composite coating comprising:
(1) an under coating deposited from a coating composition comprising:
(a) a film-forming resin; and
(b) thermally expandable capsules having an average initial particle size of 6 to 25 μm; and
(2) an over coating deposited over at least a portion of the under coating, wherein the thermally expandable capsules are in an unexpanded state, wherein the under coating is selected from the group consisting of a primer coating, an electrodeposition coating, and a pigmented basecoat.

16. The consumer electronics device of claim 15, wherein the device is selected from the groups consisting of a cell phone, a personal digital assistant, a smart phone, a personal computer, and a digital camera.

17. The device of claim 15, wherein the over coating has a 60 degree gloss of no more than 60 gloss units.

18. The device of claim 15, wherein the thermally expandable capsules have an initial expansion temperature greater than a predetermined bake temperature of the under coating and/or the over coating.

19. The device of claim 15, wherein the thermally expandable capsules have an initial expansion temperature of at least 200° F.

20. The device of claim 15, wherein the weight ratio of the thermally expandable capsules to resin solids in the coating is at least 0.25:1.

* * * * *